B. G. VON ROEDER AND E. C. OATES.
SHOCK ABSORBER.
APPLICATION FILED JAN. 17, 1921.
1,437,371. Patented Nov. 28, 1922.
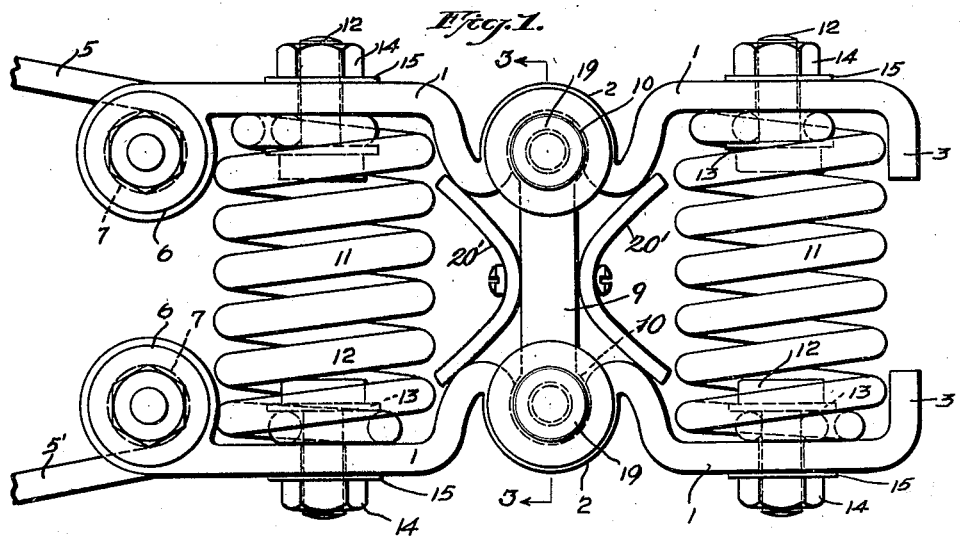
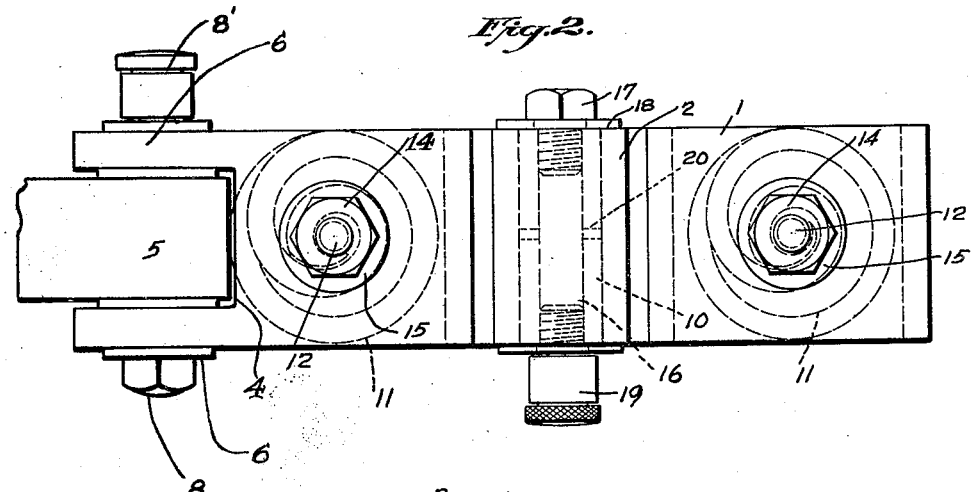
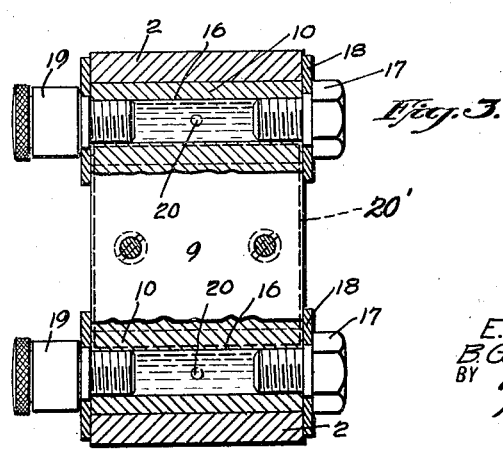
WITNESSES
INVENTORS
E.C. OATES
B.G. VON ROEDER
BY
ATTORNEYS Patented Nov. 28, 1922.

1,437,371

UNITED STATES PATENT OFFICE.

BENNO GILBERT von ROEDER AND EUGENE CAROWAY OATES, OF HOUSTON, TEXAS.

SHOCK ABSORBER.

Application filed January 17, 1921. Serial No. 437,852.

*To all whom it may concern:*

Be it known that we, BENNO G. VON ROEDER and EUGENE C. OATES, both citizens of the United States, and residents of Houston, in the county of Harris and State of Texas, have invented a new and Improved Shock Absorber, of which the following is a full, clear, and exact description.

This invention relates to improvements in shock absorbers, an object of the invention being to provide a device of this character which is primarily intended for use as a connecting and cushioning medium between the upper and lower springs commonly employed under automobile bodies, or between the upper spring and the axle, or between a spring and the frame of an automobile.

A further object is to provide a shock absorber which will be practical in construction, strong, durable and efficient in use, and one which may be readily substituted for the ordinary links now employed in this connection.

With these and other objects in view, the invention consists in certain novel features of construction and combinations and arrangements of parts as will be more fully hereinafter described and pointed out in the claims.

In the accompanying drawings:

Figure 1 is a view in side elevation of our improved shock absorber.

Figure 2 is a top plan view thereof.

Figure 3 is a view in section on the line 3—3 of Figure 1.

Referring in detail to the drawings our improved shock absorber comprises a pair of rocker members which are in the form of plates bent at their intermediate portions to form substantially three quarter circular bearing sleeves 2. At one end the plates are bent inwardly towards each other as indicated by the reference numeral 3 and at their other end the plates are bifurcated as indicated at 4. The arms 6 of the bifurcated portions are adapted to straddle the ends of the upper and lower leaf springs 5 and 5' respectively of an automobile to replace the spring links and are formed with aligned eyes 7 receiving bolts 8 to secure the shock absorber to the springs. The bolts ordinarily used in fastening the springs and links may be employed in this connection. Any approved means of lubricating this connection may be employed, such as the grease cup 8' commonly used for lubricating the link and spring joint.

A fulcrum bar 9 is formed with rounded ends 10 located in the bearing sleeves 2 and on each side of the bar 9 a spiral spring 11 is confined between the rocker members 1. We have illustrated one practical means of securing the springs between the rocker members in which we employ square headed threaded bolts 12 having their heads located within the springs and their ends projecting through the plates. Gaskets 13 are interposed between the heads of the bolts and the ends of the springs and nuts 14 and lock washers 15 around the threaded ends of the bolts serve to firmly clamp the ends of the springs between the gaskets 13 and the plates or rocker members.

By reference to Figure 3 is will be seen that the rounded ends 10 of the fulcrum bar 9 are transversely bored as shown at 16. These rounded ends are internally screw threaded and accommodate short bolts 17 at one end which co-operate with washers 18 to prevent independent lateral movement of the rocker members and the fulcrum bar. The other end of the bores receive grease cups 19. The central portion of the bore may, if desired form a reservoir for lubricant which will leak through perforations 20 in the walls of the bores and thoroughly lubricate the bearing surfaces, which are protected from an outward accumulation of dust or grit by leather shields 20' (Fig. 1) secured by any convenient means to the fulcrum bar near its middle. The entire device may be enclosed in any suitable casing (not shown) so that it will be effectively protected from the weather.

It will be readily seen that with this construction compression of one spring automatically causes tension in the other due to the double fulcrum of the members and the springs automatically stabilize each other and form a highly efficient shock absorbing member between the springs of an automobile, also that the oscillating motion of the fulcrum bar corresponds to the link motion of the ordinary elliptical springs when under compression or rebound, and that the extent of the oscillation is dependent upon the spaces between the rounded bearing ends of the fulcrum bar and the open side of the sleeve bearings. The collapsability of the device is dependent upon the amount of such space.

Various slight changes and alterations might be made in the general form of the parts described without departing from our invention, hence we do not wish to limit ourselves to the precise details set forth, but shall consider ourselves at liberty to make such slight changes and alterations as fairly fall within the spirit and scope of the appended claims.

We claim:

1. A device of the character stated, comprising a pair of normally parallel rocker plates having recesses adjacent their central portions forming substantially three quarter circular bearing sleeves, a fulcrum bar, rounded ends on the fulcrum bar fitting within said sleeves, a spiral spring interposed between the rocker plates on each side of the fulcrum bar and secured to the plates.

2. A device of the character stated, comprising a pair of normally parallel rocker plates having recesses in their central portions forming substantially three quarter circular bearing sleeves, a fulcrum bar, rounded ends on the fulcrum bar fitting within said sleeves, a spiral spring interposed between the rocker plates on each side of the fulcrum bar and secured to the plates, the rounded ends of said fulcrum bar being bored and internally screw threaded, securing devices secured into said bores and preventing independent lateral movement of the fulcrum bar and rocker plates.

3. A device of the character stated, comprising a pair of normally parallel rocker plates having recesses adjacent their central portions forming substantially three quarter circular bearing sleeves, a fulcrum bar, rounded ends on the fulcrum bar fitting within said sleeves, a spiral spring interposed between the rocker plates, a spiral spring interposed between the rocker plates on each side of the fulcrum bar and secured to the plates, one end of each of said plates being turned inwardly and the other end of each of said plates being bifurcated, the arms of said bifurcated portions adapted to straddle the ends of automobile springs and means for securing said springs within the bifurcated portions.

4. A device of the character stated, comprising a pair of rocker plates curved at their intermediate portions to provide substantially three quarter circular bearing surfaces, a fulcrum bar interposed between the plates including rounded ends fitting the bearing surfaces, flexible dust guards secured at their intermediate portions to opposite sides of the fulcrum bar and wipingly engageable with the plates.

5. A device of the character stated, comprising a pair of rocker plates curved at their intermediate portions to provide substantially three quarter circular bearing surfaces, a fulcrum bar interposed between the plates including rounded ends fitting the bearing surfaces, said rounded ends of the fulcrum bar formed to provide reservoirs for lubricant, securing devices closing the ends of the reservoirs, and said rounded ends having passages therein between the reservoirs and the bearing surfaces.

BENNO GILBERT von ROEDER.
EUGENE CAROWAY OATES.